United States Patent
Hatziathanasiou

Patent Number: 6,032,433
Date of Patent: Mar. 7, 2000

[54] MULTI-WIDTH CANOPY

[76] Inventor: Terry Hatziathanasiou, 108 Beechboro Road, Bayswater, W.A. 6053, Australia

[21] Appl. No.: 08/765,107

[22] PCT Filed: Jun. 30, 1995

[86] PCT No.: PCT/AU95/00398

§ 371 Date: Apr. 22, 1997

§ 102(e) Date: Apr. 22, 1997

[87] PCT Pub. No.: WO97/07339

PCT Pub. Date: Feb. 27, 1997

[30] Foreign Application Priority Data

May 29, 1995 [AU] Australia ................................ PN/3238

[51] Int. Cl.[7] ................................ F16B 2/22; F16B 5/06; E04H 15/64; B63B 17/02
[52] U.S. Cl. ................................ 52/742.12; 52/745.06; 52/63; 52/800.1; 52/222; 135/96; 135/120.3; 135/119; 135/117; 160/382; 160/383; 160/395; 160/380; 160/403; 24/462
[58] Field of Search ................................ 52/742.12, 745.06, 52/748.1, 63, 73, 74, 800.1, 800.12, 222; 135/117, 119, 120.3, 96, 90; 160/382, 383, 389, 395, 380, 403, 392, 391, 393, 396, 399, 401; 24/462

[56] References Cited

U.S. PATENT DOCUMENTS

| | | | |
|---|---|---|---|
| 1,484,382 | 2/1924 | Allitt | 160/395 X |
| 3,895,468 | 7/1975 | Bernstein | 52/222 |
| 3,909,994 | 10/1975 | Richter | 52/222 X |
| 4,234,035 | 11/1980 | Babbs | 160/395 X |
| 4,586,301 | 5/1986 | Hickman | 52/222 X |
| 4,651,490 | 3/1987 | Marston | 52/222 X |
| 4,694,543 | 9/1987 | Conley | 52/222 X |
| 4,769,877 | 9/1988 | Conley | 160/395 X |
| 4,799,299 | 1/1989 | Campbell | 160/395 X |
| 4,817,655 | 4/1989 | Brooks | 52/222 X |
| 4,887,626 | 12/1989 | Dalo et al. | 52/222 X |
| 4,912,900 | 4/1990 | Yeamans | 160/395 X |
| 5,044,131 | 9/1991 | Fisher | 52/63 |
| 5,209,029 | 5/1993 | Foerst | 52/222 X |
| 5,259,323 | 11/1993 | Koch et al. | 160/395 X |
| 5,333,425 | 8/1994 | Nickerson et al. | 52/222 |
| 5,522,635 | 6/1996 | Downey | 160/383 X |
| 5,577,352 | 11/1996 | Fisher | 52/63 X |
| 5,613,544 | 3/1997 | Schaefer | 160/395 |

FOREIGN PATENT DOCUMENTS

| | | | |
|---|---|---|---|
| 286318 | 3/1967 | Australia | 160/395 |
| 36221/68 | 3/1970 | Australia . | |
| 88485/82 | 3/1983 | Australia . | |
| 38379/85 | 7/1985 | Australia . | |
| 39983/89 | 2/1990 | Australia . | |
| 0389104 | 9/1990 | European Pat. Off. . | |
| 2641789 | 3/1978 | Germany . | |
| 717245 | 2/1980 | U.S.S.R. | 52/63 |
| 1165725 | 10/1969 | United Kingdom | 160/395 |
| 1302607 | 1/1973 | United Kingdom . | |

*Primary Examiner*—Laura A. Callo
*Attorney, Agent, or Firm*—Sheridan Ross P.C.

[57] ABSTRACT

A fastening device for adjustably securing a flexible sheet comprising a first fastening component (62) having a recess (62*a*) formed therein. A portion of the flexible sheet is secured in the recess (62*a*) by cooperation of a second fastening component (61) after location of the portion in a desired position relative to the recess (62*a*). Canopies employing the fastening component are also disclosed.

19 Claims, 6 Drawing Sheets

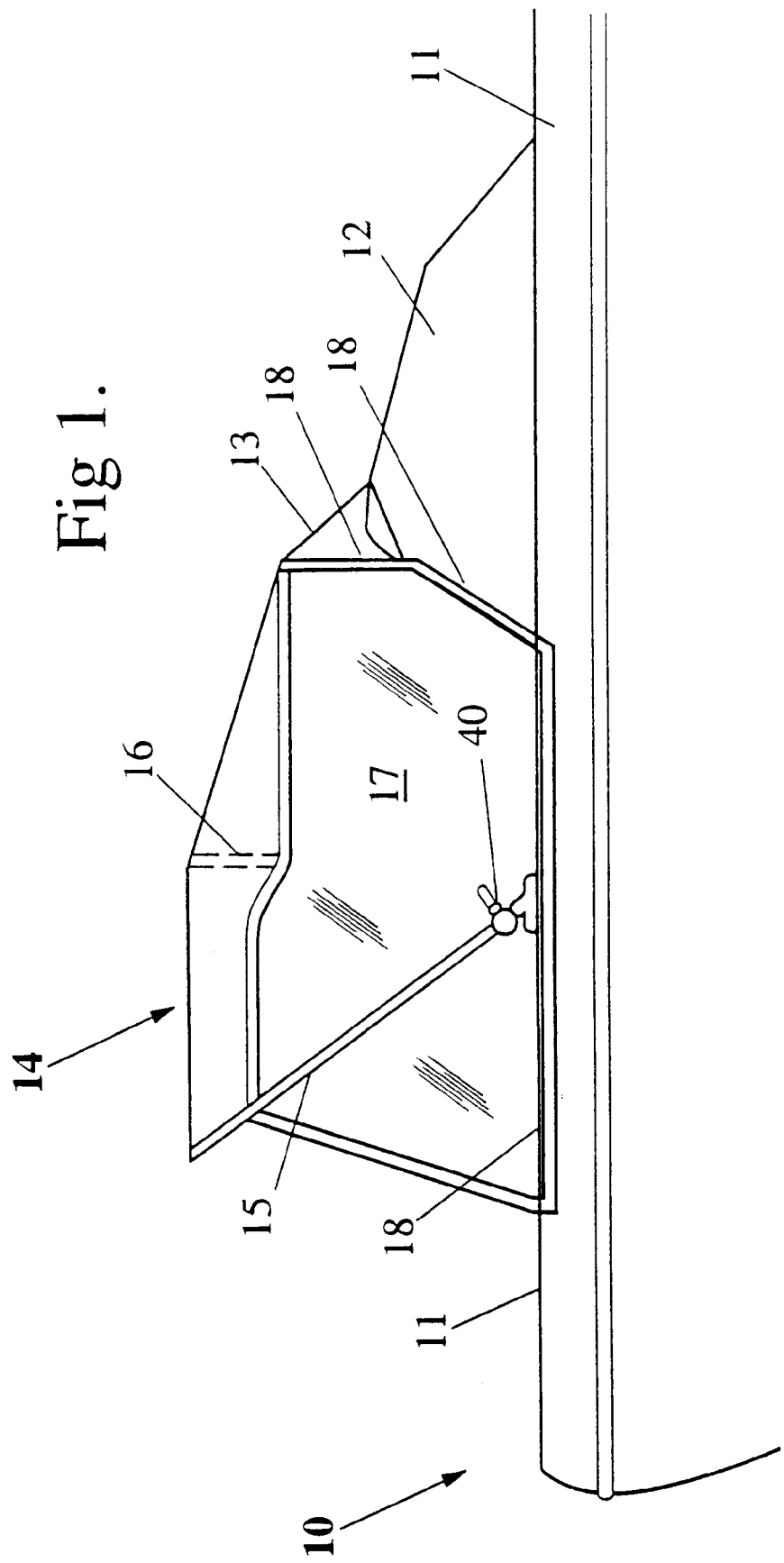

Fig. 2a
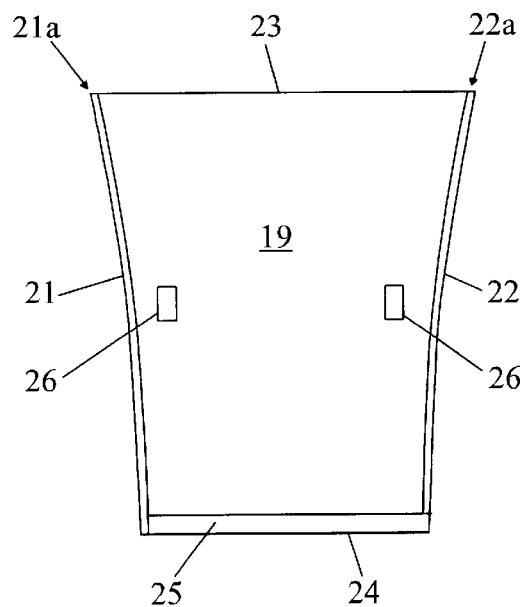
Fig. 2b
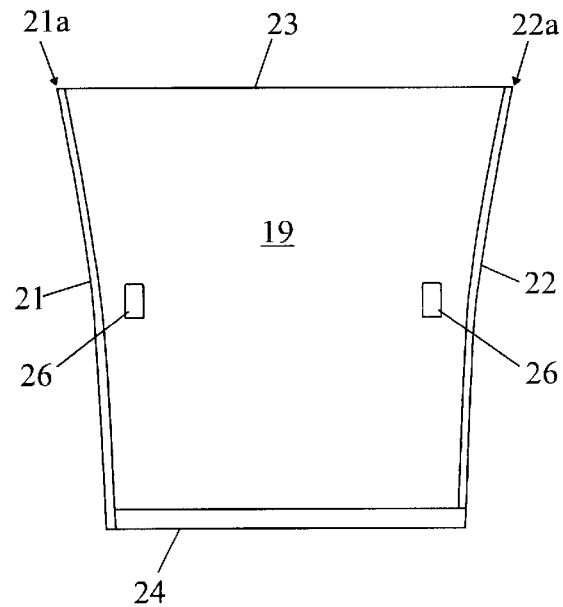
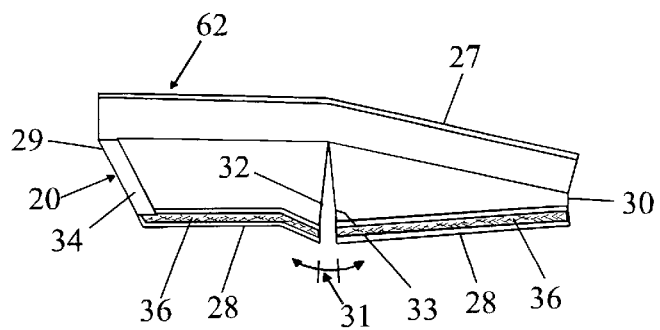
Fig. 2c

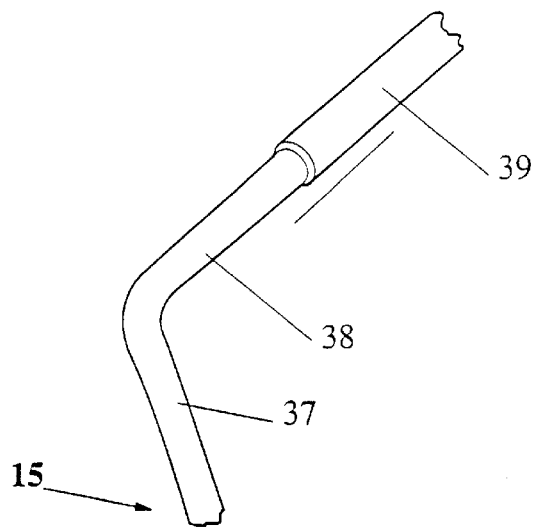
Fig 3a.
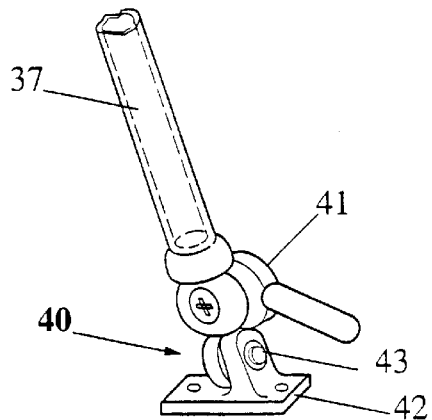
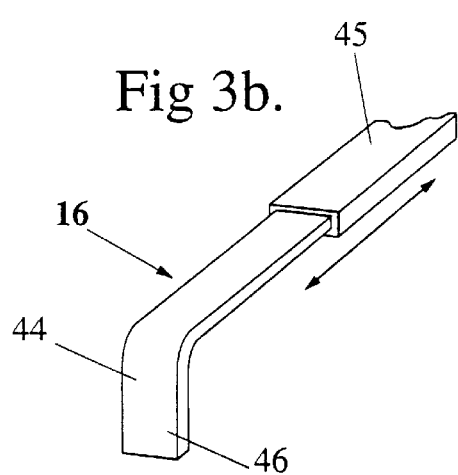
Fig 3b.
Fig 4.
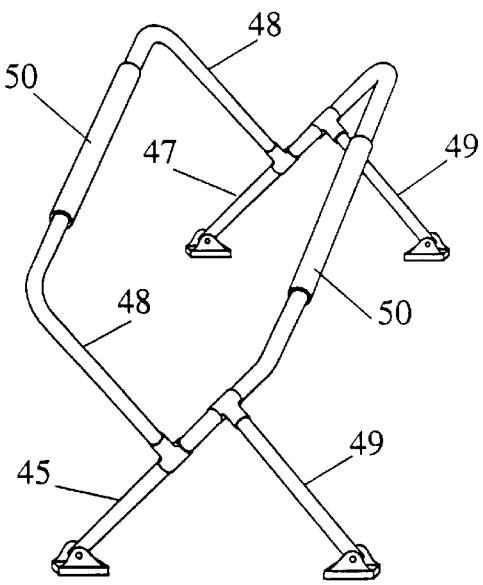

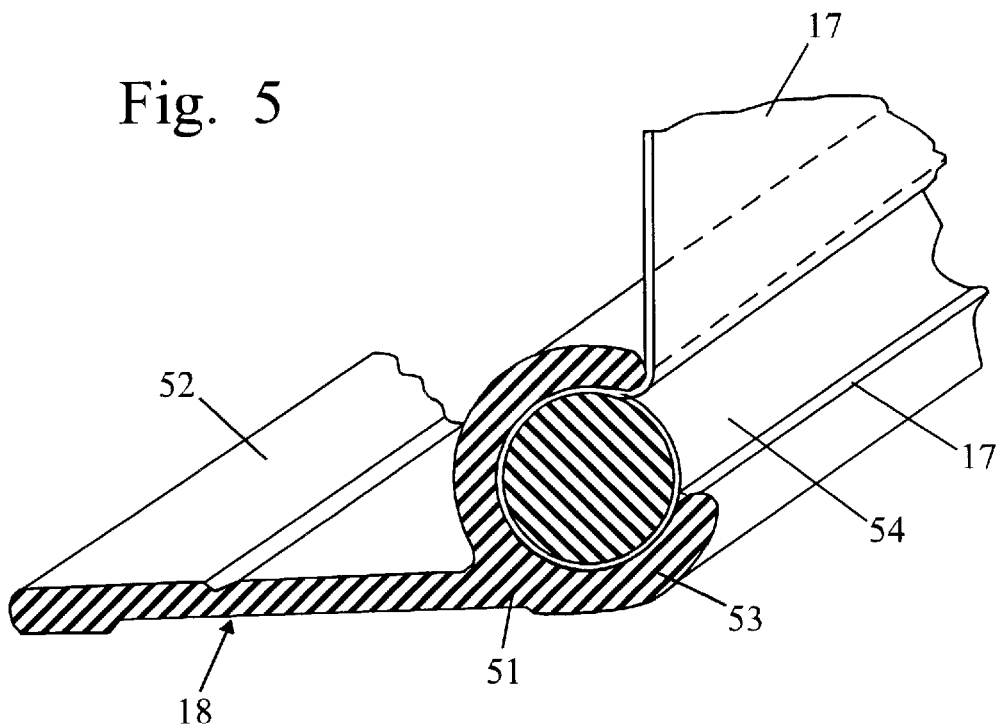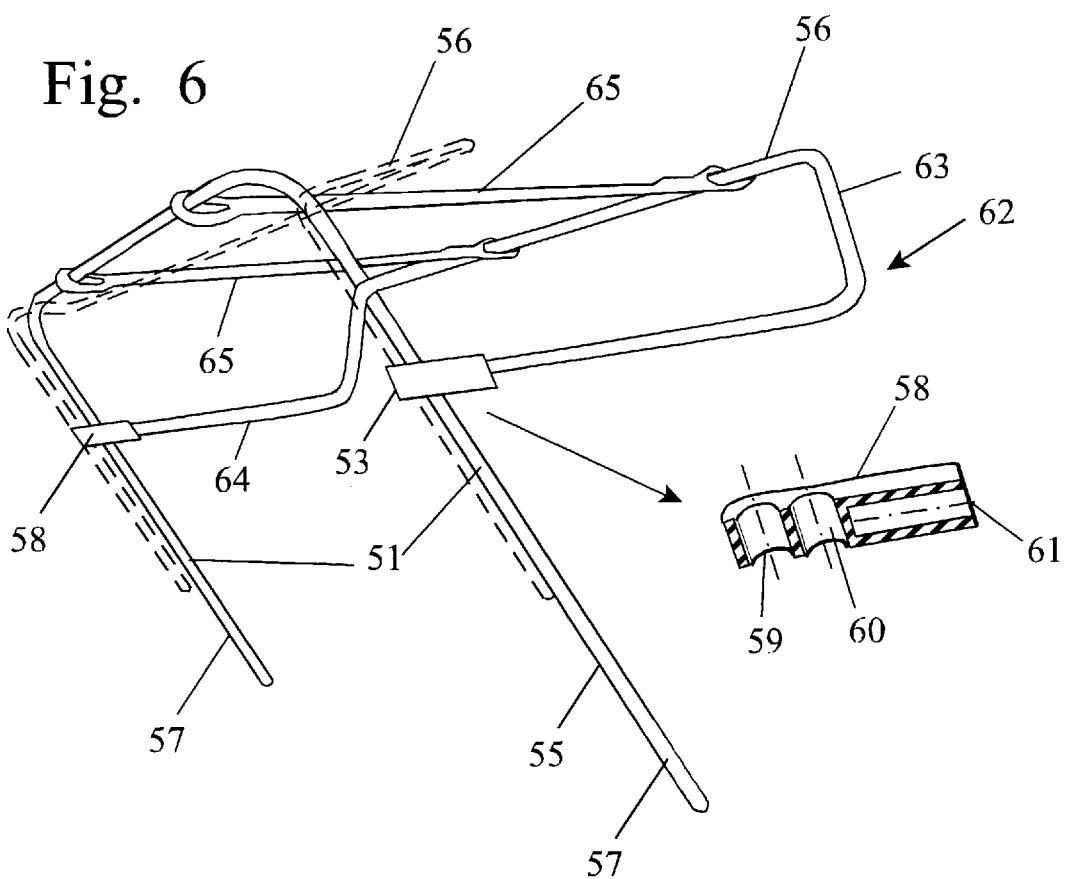

MULTI-WIDTH CANOPY

The present invention relates to a fastening device for securing sheets of materials for applications such as construction of canopies or other structures. Fastening means for use in the method are also the subject of the invention.

Canopies, for example, may be used for many applications, for example in the automotive, canvas, building and gardening industries. Canopies may, however, find application in other fields of endeavour.

In the boating area, canopies are individually produced for each boat or launch because of their different shapes and sizes. The effect of this is that such canopies are time consuming and costly to produce.

Another problem arises in that where the canopy consists of several sections, the fastening of these sections together may cause problems. Where a fastening material such as "velcro", for example, is used as the fastening means, the "velcro" may become worn very quickly and therefore the canopy may only be of use for a certain period of time shorter than the durability of the material constituting the section would dictate. In addition, it is desired to fasten the sheets together in a neat and tidy manner. For this reason, "velcro" is also undesirable. That is because it is generally difficult to fasten each sheet along a neat line. As a result, and no matter what the effort expended to provide a neater job, the finished product will still look somewhat untidy.

A construction such as this has been disclosed in Australian patent No. 616995. In that patent, there is disclosed a boat or launch canopy construction which comprises at least two sections. Each section is of a weather protective flexible sheet material which has a longitudinal edge zone arranged to extend generally in the longitudinal direction of the boat or launch when the canopy is erected thereon. Each section has a releasable surface fastening means secured to each edge zone along substantially the length thereof. This fastening means is adapted to interact to secure the edge zones together when the respective surface fastening means are in an overlaying contact. Importantly, the fastening means on one edge zone is wider than that on the other edge zone to enable selective assembly of the sections together with a range of degree of overlap to provide a range of canopy widths.

The surface fastening means in that patent is specifically of a surface fastening material such as "velcro". As noted above, "velcro" is a material that wears easily and it is difficult to obtain a neat securement of the edge zones together when such a fastening material is used.

It is an object of the present invention to provide a device for securing flexible sections or securing such sections together that is both durable and adjustable. In such a manner, canopy constructions, for example; may be produced and assembled in a range of sizes and styles in a quick and inexpensive manner from a limited stock of parts.

In accordance with a first aspect of the present invention, there is provided a fastening device for adjustably securing a flexible sheet comprising a first fastening component having a recess formed therein, a portion of said flexible sheet being secured in said recess by cooperation of a second fastening component with said first fastening component after location of said portion in a desired position relative to the recess.

Conveniently, the portion of the sheet is accommodated within the recess and then secured therein by securable positioning of the second fastening component within the recess.

The fastening components may be made detachable to achieve adjustment of the flexible sheet portion within the recess though this is not essential. For example, it may be desirable to leave an excess of flexible sheet material in order to allow variable tensioning of the flexible sheet. Alternatively, the sheet may form a section that is to be used for various applications requiring various sizes of sections to be constituted by the flexible sheet. Sections for use in canopies fall into this category. Therefore, the fastening device may effectively be used to allow such adjustment while keeping costs of fastening devices and flexible sheet material lower than would be the case if specific sections had to be purchased to cater for each particular duty.

In contrast, the fastening device may be used to enable a user to assist trimming of excess material away from the device to leave a neat line of fastening. In such manner, it is possible to avoid the untidiness that would be obtained by using "velcro", for example, as the fastening means. However, the fastening components are still ideally made detachable enabling sheet replacement when a first sheet becomes worn or damaged, for example.

The second fastening component is locatable within the recess and may be substantially non-planar to promote adjustability. Further, the second fastening component need not be fully enclosed by the flexible sheet portion. In this way, adjustment may be facilitated because enclosure of the second fastening means by the sheet portion may entail formation of a loop of material by turning the material over on itself and fastening, usually by stitching. Such a method is inimical to adjustability as above described.

A number of sheets may have portions accommodated and secured within the recess, if desired and the recess may be of any convenient geometry. A simple geometry for the recess would be a rectangular or semi-circular channel but other geometries may be employed.

The second fastening component may extend beyond an open end of the recess to be readily gripped or handled by the user of the device so as to enhance the detachability and adjustability of the device without compromising the securement when the fastening device is in use.

The second fastening component may be securably positioned in the recess in a number of ways. For example, the second fastening component may be snap or interference fitted into position.

The first or second fastening components may themselves be attached to flexible sheets by connecting means either permanently or detachably. Where the sheet is fastened to either of the fastening components, a portion of the connecting means may be protected either by being partially embedded in one fastening component or covered or protected by a portion of one or other of the fastening components proximate the connection means. In this way, the connection may be made more secure. For example, where the first fastening component includes a channel shaped recess in which the further flexible sheet is located and the first fastening means is connected to a flexible sheet by connection means, the connection may be made along an axis extending through the channel by connection means being, for example, stitches, rivets or staples. Thus, when the second fastening component and sheet portion are located and securably positioned within the channel, a portion of the connection means is covered and protected by the sheet and second fastening component. The portion of the connection means extending through the sheet to which the first connection means is attached may be protected simply by being on the protected side of the sheet, for example, the interior side of a flexible sheet constituting a canopy section.

Rather than being connected directly to a portion of a further flexible sheet, the first or second fastening component, or assembly thereof, may engage with a third fastening component which may itself be connected to a further flexible sheet, perhaps in the manner above described with respect to the first and second fastening components. Also, engaging surfaces of the first or second fastening components or an assembly thereof may typically engage with complementary engaging surfaces provided for the purpose on the third fastening component. The third fastening component might have, for example, a recess into which the first or second fastening component or assembly thereof may be fitted by snap or interference fitting for example. Still further, flexible sheets may be secured within the fastening device constituted by all three fastening components by placing portions thereof between the engaging surfaces of the fastening components, as the point of engagement provides by its very nature a good point of securement.

The first fastening component may be sufficiently smaller in dimension than the recess in the third fastening component that the second fastening component may be required to cooperate with the recess in the first fastening component in order to ensure, for example, expansion of the first fastening component to a size that enables engagement and securement thereof within, for example, a recess in the third fastening component to ensure the securement of flexible sheet(s) by the fastening device. For example, the second fastening component may be of slightly expansible material wherein expansion to enable securable positioning of the second fastening component within the first fastening component is required. Expansion may be caused by fitting the second fastening means into a cavity or recess of the first fastening component. Upon such fitting of the second fastening component within the cavity or recess provided in the first fastening component the necessary expansion may be achieved. Of course, securement could be achieved by any other means that enables securement of the first or second fastening components or assembly thereof to the third fastening component.

Such a two part top formed by the first and second fastening components enables the top to be fully adjustable and removable from its base profile, or third fastening component. This ability to still hold the fabric independently of the base channel and allowing it to be bent or rolled unaffected is a substantial advantage.

Any of the fastening components, as described above, may be of plastics, metal or any other suitable construction. Further, the fastening components may be rigid or flexible and rigid fastening components may cooperate with flexible components to achieve securement. For example, the first fastening component could be a rigid channel shaped strip and the second fastening component could be flexible to enable location thereof within the channel shaped recess. Alternatively, the channel shaped strip could be flexible or have flexible portions to enable a rigid, flexible or partially flexible second fastening component to be brought into engagement therewith.

Along with flexibility, the fastening components, particularly those connected to flexible sheets may desirably be made conformable with the edge of the flexible sheet facilitating assembly and ensuring maximum utility of stock constituting the fastening component. For example, a flexible sheet may be cut to a certain shape and it may be desired to connect a fastening component to the sheet along an edge thereof. In this case, the fastening component may be manufactured from a partially or fully flexible plastic material so that the fastening component is contourable and conformable to the shaped edge of the flexible sheet.

If desired, the fastening component may have embedded within it a wire or flexible strip to ensure that any shape to which the fastening component is contoured will be maintained after conformation to the shape of the edge zone of the flexible sheet to which the fastening component is connected. Alternatively, or additionally, the fastening component(s) could be contourable to the shape of a flexible sheet which is secured by the fastening device.

Such a multi-directional fastening component which is able to be bent or shaped to any surface may utilise the mounting fixtures surface to maintain strength, while the flexibility to be shaped and loaded with variable fabric widths is maintained. In this way, the fastening method may be totally concealed from sight and fixings can be sealed from exposure to the elements, thus forming a substantially waterproof, dustproof, and hygienic environment between the profiles and its mounting fixture, In a further aspect, the present invention provides a method of adjustably securing a flexible sheet using at least three interfitting fastening components; including placing a portion of said sheet in a first recess provided in a first fastening component; securing said sheet in said recess with a second fastening component; and securing an assembly comprising said first and second fastening components and sheet secured therein in a second recess provided in a third fastening component.

In a further aspect, the invention provides a canopy construction comprising a plurality of sections, one said section being connectable to at least one more of said plurality of sections, a first fastening component connected to one said section and having a recess therein in which a portion of at least one other section is accommodated and adjustably secured by engagement of a second fastening component within said recess, preferably after location of said portion therewithin.

The first fastening component may be connected to the other section directly or through the agency of a third fastening component with which said first fastening component or an assembly of first and second fastening components is engaged to ensure securement of the at least one other section.

In a still further aspect, the invention provides a kit of parts for constructing a canopy which includes fastening devices of the kind above described.

Several preferred embodiments of the present invention will hereinafter be described with reference to the accompanying drawings, in which:

FIG. 1 is a side elevation view of a typical canopy produced according to the present invention;

FIGS. 2a, 2b and 2c, are plan views of sections adapted for use in canopy constructions according to the present invention;

FIGS. 3a and 3b are illustrative views of support bows to maintain the canopy sections in their desired installed position as shown in FIG. 1;

FIG. 4 is an illustrative view of an alternative support bow; and

FIG. 5 is a view of fastening means adapted to fix the front end of the canopy to a boat;

FIG. 6 is a perspective view of an alternative form of centre bow and support thereof;

Figure 2D:
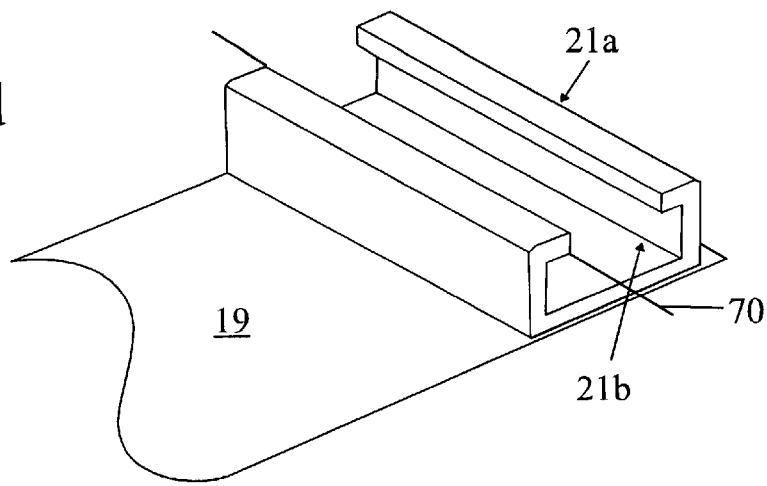
FIGS. 2d, 2e and 2f show diagrams of the first fastening means, a second fastening means and the manner in which securement of sections is achieved in accordance with the invention.
Figure 2E:
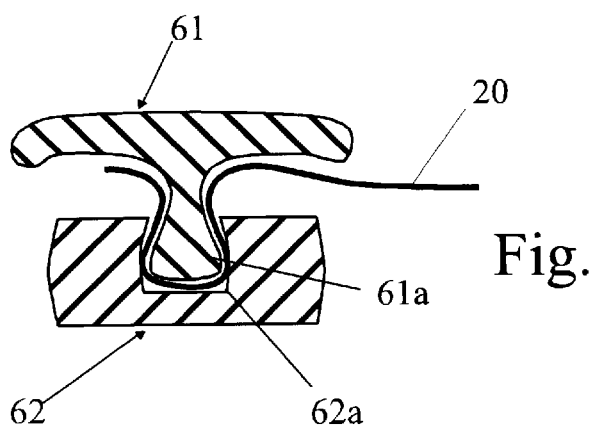

Whilst the following discussion is made in respect of a boat, the present invention is not limited to boat canopies or canopies per se. It is equally possible to use the invention in automotive, canvas, building, gardening or other applications.

Referring now to FIG. 1, the boat 10 is of conventional design having a deck surface 11, a forward cover 12 and windscreen 13. The canopy 14 extends rearwardly from a top edge of the windscreen 13 to a rear support bough 15. A central support bow 16 (shown in more detail in FIG. 3b) is provided to maintain the canopy construction in shape and in position as illustrated in FIG. 1.

Side panels 17, preferably including flexible transparent sections, are connected to the canopy and, at the lower edge, to the boat deck 11, front cover 12 and the windscreen 13. This connection is preferably achieved by continuous fastening element 18 described hereinafter with reference to FIG. 5.

Referring now to FIGS. 2a, 2b and 2c, the general construction of the canopy 14 is shown, comprising a central section 19 (FIGS. 2a or 2b) and a pair of similarly shaped side sections 20 (FIG. 2c). Each of the sections 19 and 20 is made of a known flexible sheet material being generally non stretchable, weather resistant and a barrier to the passage of water, though it is not intended that this impose a limitation on the nature of the materials that may be secured by the fastening device of the present invention. It may be necessary to supply a small number of different sized central sections 19 (two being as shown in FIGS. 2a and 2b) to allow for differing width boats, however, with the use of the canopy constructed as described herein, a large proportion of normal sized boats can be accommodated with a selection of two or three alternative essential sections. Similarly, it may be necessary to supply different sized side sections 20 although most boats would be accommodated by two different sized side sections. The general shape of these sections will be as shown in FIG. 2c.

The side sections 20 of the canopy are each constructed with an upper longitudinal edge 27, a lower longitudinal edge 28, a rear edge 29 and a forward edge 30. The side sections are initially planar as shown in FIG. 2c, but a dart 31 is formed as shown and the edges 32, 33 of the dart may be sewn together to provide a three dimensional shape. The rear edge 29 has a sewn pocket 34, similar to the pocket 25 in the central section to receive the support bow 15 therethrough.

Figure 2F:
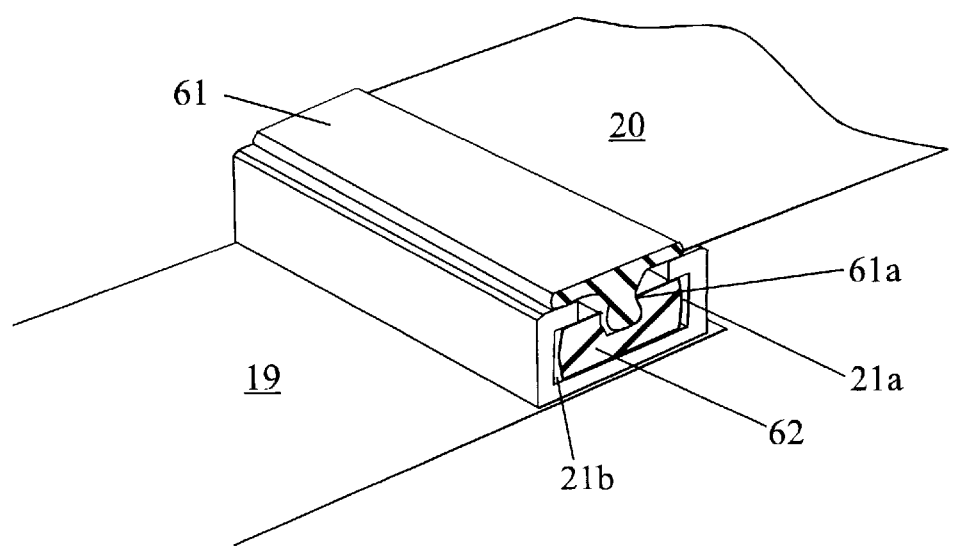

As shown in FIG. 2f, a first fastening component in the form of a channel, the base 62 of which is illustrated, engages, by location within the channel 21a or 22a, with a third fastening component. The channel 62 forms part of a fastening assembly secured to the edge zone of the side section 20 adjacent to the upper longitudinal edge 27. It will be noted here that channel 62 follows the shape of the edge of side section 20 and is designed to be conformable to the shape of the edge for this purpose. This securement is to be described in more detail hereinbelow and, as illustrated in FIG. 2c, is made on the downwardly facing surface of the side section 20. The lower edge 28 of the side section 20 also is provided with a channel shaped fastening component to enable connection of this edge zone to the side panel 17. In the embodiment shown, the fastening means is a channel 28. The channel 28 is secured on the upwardly facing surface of side section 20; its function is as described hereinbelow with reference to channel 62 as shown in FIG. 2c.

Each central section has two longitudinal edges 21 and 22 with a channel provided as the third fastening component 21a, 22a permanently or detachably connected by welding, riveting or other suitable means along a relatively narrow zone adjacent the longitudinal edges 21, 22. Desirably, the connection means are located along axis 70 of channel 21b as conveniently seen in FIG. 2d. The axis 70 may be located along the centre of channel 21b but may be offset, if desired. The width of the channels 21a, 22a may be of the order of 15 to 20 millimetres though the channel 21b is narrower at its top as shown in FIG. 2d due to the protrusion of side walls of the channel 21b inwardly over the channel. In such manner, there is provided a recess in the form of a slot through which the channel 62 may be slid, press fitted or otherwise engaged.

Turning now to a consideration of the connection of the channel 62 to side section 20, this is achieved in the following manner with the aid of a second fastening component 61 constructed of a rigid or flexible, ideally wear-resistant material such as a suitable plastic or metal. The second fastening component 61 is a substantially non-planar T-shaped component having a bulbous base 61a which enables it to securely engage with the channel 62 within the channel recess 62a. The top of T-shaped component 61 has a width which may be slightly greater than the width of channel 62. However, the width could be equal to or slightly less than the width of the component 62. The actual selection will depend largely upon aesthetic considerations, it being remembered that an objective is to provide securement of two sections, for example, in a neat and tidy fashion.

The channel 62 is also constructed of a rigid or flexible, ideally wear-resistant material such as a suitable plastic or suitable metal and the channel recess 62a has the function of accommodating a portion of the sheet constituting section 20. Such accommodation may advantageously be obtained by pressing a portion of the sheet 20 into the channel 62a. However, other means could be found to achieve or assist such accommodation. For example, prongs could be provided at the base of the channel 62a which cooperate with corresponding holes provided in the sheet 20. A loose fit or accommodation may also be catered for, if desired. Further, more than one sheet may be accommodated, if required.

Having achieved accommodation of the sheet 20, conveniently in the region of the longitudinal edge zone of the sheet 20, within the channel 62a, the accommodation may be made secure by pressing or otherwise engaging component 61 within the recess 62a to secure the portion of sheet 20 between the walls of channel 62 forming the recess 62a and the bulbous base 61a of component 61. Any excess material may then be trimmed back along the edge of component 61 remote from the plane of sheet 20, if desired. In this way, a neat appearance can be achieved. Alternatively, adjustable securement can be achieved to enable sheet 20 to be of appropriate area for the particular duty it is required to perform. If variation in area is required the fastening device is disassembled and resecured in such manner that the desired area of sheet 20 is achieved. Thus the system is adjustable, allowing a single sheet 20 to be used for a number of different applications.

Such securement of the portion of sheet 20 by the assembly constituted from engagement of component 61 and channel 62 may be made releasable to allow re-use of one or both of the fastening components after replacement of the sheet 20 due to wear or other cause. Alternatively, the assembly of components 61 and 62 may be secured together by adhesives or other fastening means.

Before leaving the assembly of the first and second fastening components 61 and 62, it will be apparent to those skilled in the art that the first fastening component 62 could be directly connected to a flexible sheet thus eliminating the need for a third fastening component 21a as above described and it is not intended to limit the scope of the invention in this regard. Further, sheet 20 could be preliminarily secured to channel 62 or T-shaped component 61, if desired.

Upon completion of securement of the sheet 20 by the assembly of the first and second fastening components 61 and 62, the assembly is, in a preferred embodiment, brought into engagement with the third fastening component 21a by pressing it or sliding it within channel 21b. The protrusions of the side walls of channel 21b may be made resilient but flexible to assist press-fitting. If the assembly of components 61 and 62 is pressed into channel 21b the protrusions flex, allowing location of the lowermost portion of the assembly within the channel 21b. Once inserted, the protrusions recoil to their original position slightly overlapping channel 62 to ensure securement of the assembly within channel 21b. Such securement may be further enhanced by ensuring a neat fit of the base and portions of the upper surfaces of channel 62 with the channel 21b. The top of T-shaped component 61 then advantageously rests upon the protrusions of the side walls forming the channel 21b. In such manner, the T-shaped component 61 is readily accessible by the user when adjustment is required. Where a press fit is desired, it may be desirable to chamfer the protrusions of the side walls forming the channel 21b.

Upon completion of engagement of the assembly of first and second fastening components 61 and 62 with the third fastening component 21a, sheets 19 and 20 are secured together. In a similar manner, the remaining sections may be secured together. It is to be noted that, following securement, the connection means set along axis 70 are covered and thus protected by second fastening component 61. It is also to be understood that more than one sheet could be secured by the assembly of components 61 and 62. Further, additional sheet(s) could be accommodated within channel 21b and secured by engagement of the assembly within the channel.

The positions of the fastening means are completely interchangeable and, for example, sheet 19 could be accommodated within first fastening component 62 rather than sheet 20.

As a final observation, it will be noted that second fastening component 61 is not fully enclosed by the sheet 20 in the secured position. Such a construction favours adjustability of the fastening device which it is a preferred object to promote.

The forward end edge 23 of the central section is left plain for connection with the fastening element 18 as hereinafter described, and the rear end edge 24 is folded back and sewn to form pocket 25 to accommodate threading of the support bow 15 therethrough. Connecting tabs 26 are provided on the surface of the central section 19 to which the channels 21b are attached by welding or other suitable means and spaced inwardly from the edges 21, 22. The tabs 26 may be formed from a material such as "velcro", being constructed to wrap around the central bow or support member 16 to maintain same in position when the canopy is installed as shown in FIG. 1.

Referring to FIGS. 3a and 3b, the support bows 15 and 16 are illustrated in more detail. The rear bow 15 is produced from tubing, conveniently formed from a light rigid metal such as aluminium but other corrosion resistant metals such as stainless steel might be used. Each bow 15 is formed by two side uprights 37 bent to 90° at its upper end to form a generally horizontal cross piece 38. A tubing length 39 is provided having an internal diameter to provide a neat sliding fit on the outside of the cross piece 38. In this manner, a generally U shaped rigid support is formed with the base of the U being extendible to adjust for boats of differing widths by the extent of projection of the cross pieces 38 into the tube 39.

At the lower end of each side upright 37 is a clamp or fixing member 40 adapted to secure the bow 15 to the boat. In the drawing, the uprights 37 are shown fitting over a spigot of the fixing member 40, however, it will be appreciated that the tubing may also fit within a socket formed as part of the fixing member 40. The fixing member 40 includes a manually adjustable clamp 41 to adjust and securely fix the uprights 37 in the desired rearwardly directed angular position to rearwardly tension the canopy 14 from the forward windscreen 13. The clamp 41 is mounted on a fixing bracket 42 via a horizontal pivot pin 43 so that the bracket 42 can be fixed either to a horizontal or a vertical surface of the boat structure. The central bow 16 is similar to bow 15 and is conveniently formed by two L shaped bar elements 44 and a central tube 45 that has a sliding fit on the side bar elements 44. This arrangement again permits adjustment for varying width boats. The horizontal or upper section of the bow 16 can be attached to the canopy 14 via the tabs 26 on the central section 19. The downwardly depending legs 46 may be supported in the edge zones 36 of the side section 20.

FIG. 4 illustrates an alternative form of support bow generally corresponding to that which is commonly used with a custom made and fitted boat canopy. The arrangement comprises a main U shaped support bow 47 pivotally mounted to a boat deck which is generally equivalent to the support bow 15 illustrated in FIGS. 1 and 3a. A secondary U shaped support bow 48 is provided pivoted to the legs of the main support bow 47. The bow 48 is forwardly angled and is equivalent in function to the central support bow 16 of the previously described embodiment. Rearwardly directed and angled braces 49 are provided to physically stabilise the canopy support structure.

The general configuration of the above described support structure is basically conventional except that it is necessary to provide the horizontal cross pieces of the U shaped supports 47 and 48 extendible in length to adjust for varying width boats. To achieve this, the cut sleeves 50 and 51 are provided operating in the same way as the tube members 38 and 39 described above in relation to the support members 15 and 16.

The arrangement shown in FIG. 5 provides a new and convenient means of attaching the lower edge of the canopy configuration to the boat. Conventionally, this is achieved by a plurality of press studs or other similar individual fastener devices. The present proposal is to provide an extruded channel section 51 which would be fastened in the desired position along the boat deck 11, across the forward deck cove 12 and the top of the windscreen 13. The channel section 51 comprises a fixing plate section 52 and an integral C shaped groove 53. The lower and forward edges of the side panel 17, and the forward edges of the central and side sections of the canopy 14 can then be located in the C shaped groove 53 and retained therein by a circular retaining element 54 such as shock cord, rope or the like.

There is illustrated in FIG. 6, a further alternative construction of the bows for supporting the canopy. In this construction, the main rear bow 55 is substantially the same as the bow 15 and is attached to and supported by the boat in the same manner as described in relation to the bow 15. However, the centre bow 56 is constructed in a different shape to bow 16 so as to be detachably mounted on the rear bow 55.

The legs 57 of the bow 55 carry respective mounting block 58 (one of which is shown in enlarged cross section). The mounting block has two transversed through holes 59, 60 at one end and axial blind holes 61 at the other end. The holes 60 receives the leg 57 of the bow 55 and is secured in the desired location thereon by set screw (now shown).

The legs 62 of the centre bow 56 are each cranked to provide a vertical section 63 and a horizontal section 64. The rear end of the horizontal section 64 is, in use, received in the axial hole 61 whereby the centre bow 56 is supported by the main bow 55. When the canopy is not erected, it may stowed as shown in broken outline with the horizontal section 64 of the leg 62 extending through the holes 59 in the mounting block 58.

The straps 65 limits the forward movement of the centre bow 56 in a known manner and are of conventional construction. As shown in FIG. 6, the cross pieces of the bows 55 and 56 are of a one piece construction, but normally would be of a two piece construction with joining sleeves as described with reference to FIGS. 3a and 3b.

Figure 7:
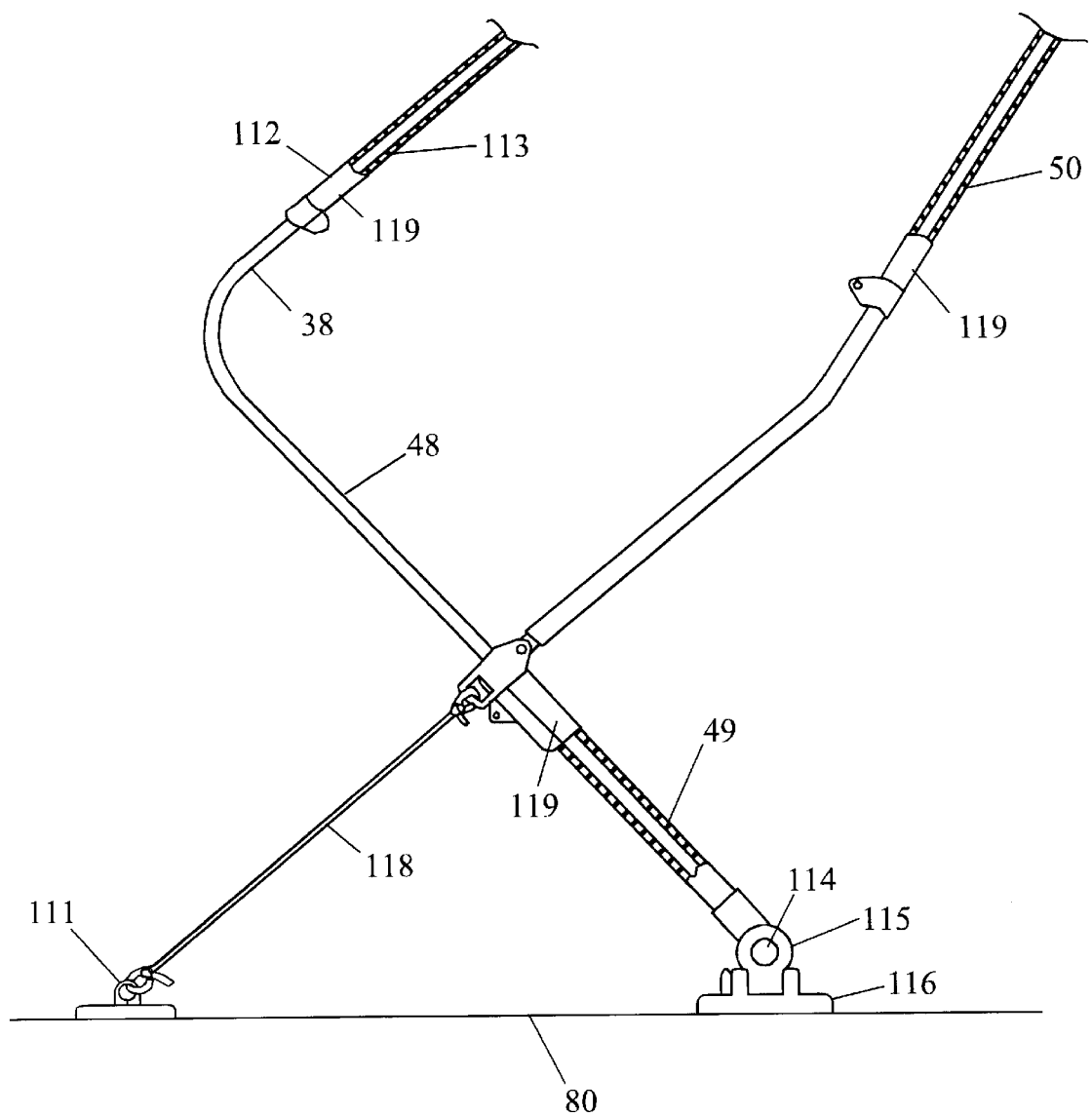
FIG. 7 is a perspective view of a further alternative form of centre bow and support thereof.

Referring now to FIG. 7, there is shown an alternative form of the bows for supporting the canopy. Once again, as shown in FIG. 4, a secondary U shaped support bow 48 is provided but it is formed in an integrated fashion with the angled brace 49 to become the main support bow. In this fashion the main support bow 47 may be omitted and replaced with a tensioning strap 118 attached to the fixing bracket 111. However, this is not essential and an additional brace could be provided instead if desired.

The embodiment shown in FIG. 7 shows that the canopy supporting frame may be designed in a flexible manner to accommodate a wide range of canopy shapes and sized. Two features allow this.

First of all, the sleeve 50 may be redesigned such that support member 38 is slidable relative to the sleeve 50 or vice versa. When the desired length is achieved the desired length may be maintained by adjusting a screw or similar fitting so tha portion 38 no longer slides within sleeve 50. In similar fashion, support bow 48 may be made of narrower gauge tubing than sleeve 119 so as to slide within the sleeve member 119. This allows the required length of the support member constituted by support 48 and brace 49 to be achieved. Again, when the desired length is achieved it is maintained in the desired position by adjusting a screw or similar fitting so that support 48 no longer slides within sleeve 119. If desired, the sleeve 119 and brace 49 may be incorporated into a single member with the gauge of brace 49 being greater than that of support 48 to achieve this result. Of course, the above relative dimensions of supports 48 and 49 may be reversed, if desired.

Secondly, the inclination of the support member constituted by support 48 and 49 may be adjusted as desired by adjusting the manually adjustable clamp 115 by means of the adjusting screw 114 attached to fixed brace 116. Once this is done the tensioning strap 118 may be fixed into position fastening it to fixing bracket 111.

In this manner, the desired shape and size of canopy can be readily accommodated using the present invention. It will be understood that, though only one side of the canopy support structure has been described herein, the same fittings may be employed on the other side of the support structure and would function in precisely the same manner. The canopy construction thus described enables a canopy to be provided for a wide variety of boat styles and sizes from a small number of standardised parts. The arrangement can be readily installed, for example, by a boat owner or by a professional boat canopy producer and installer. Similarly, the canopy can be readily installed by users in other applications. Once the canopy is fitted, the installer simply trims off any excess material along the lower fastening strip 18 or the joints between the central and side sections of the canopy arrangement itself. The arrangement is therefore simple and comparatively inexpensive to produce and install.

The fastening device of the invention may also be used for other applications and is not to be taken to be limited in its use to the construction of canopies. Any application wherein structures are comprised of sheets of material which are secured together are potentially suitable for the use of the fastening device of the invention described hereinabove.

I claim:

1. A method of adjustably securing a flexible sheet using at least three intermitting fastening components; including placing a portion of said sheet in a first recess provided in a first fastening component; securing said sheet in said first recess by cooperation of a locking portion of a second fastening component with said first recess; and securing a secured portion of an assembly comprising said first and second fastening components and flexible sheet to a third fastening component by engagement of an engaging surface of the assembly with a complementary engaging surface of said third fastening component, wherein said third fastening component includes a second recess, accommodative of a whole of said first fastening component on completion of securement, said complementary engaging surface is a surface of the second recess and said second recess is smaller than at least the secured portion of the assembly formed by said first and second fastening components wherein said first recess is bounded by walls which partially overhang said first recess at an open end thereof and a part of said second fastening component at least partially overlaps said overhang of said walls bounding said first recess.

2. A method as claimed in claim 1, wherein each said fastening component is selected from a rigid material, a flexible material, or a combination of both flexible and rigid material in accordance with an application for which the fastening components are intended.

3. A method as claimed in claim 1, wherein said first recess is smaller than said locking portion of said second fastening component which cooperates therewith to secure the sheet.

4. A method as claimed in claim 1, wherein said fastening components are detachable.

5. A method as claimed in claim 1, wherein said second fastening component is locatable within said first recess without being fully enclosed by said portion of said flexible sheet.

6. A method as claimed in claim 1, wherein said second fastening component is substantially non-planar.

7. A method as claimed in claim 1, wherein a portion of a second flexible sheet that is discrete from the flexible sheet is placed in said first recess prior to securing said sheets in said first recess with said second fastening component.

8. A method as claimed in claim 1, wherein said second fastening component and said flexible sheet are independent of each other.

9. A method as claimed in claim 1, wherein said first fastening component is connected to a second flexible sheet that is discrete from the flexible sheet.

10. A method as claimed in claim 9, wherein said first fastening component is connected to the second flexible sheet by connection means extending beyond a wall forming a base of said first recess.

11. A method as claimed in claim 1, wherein said first fastening component is connected to said second flexible sheet by connection means having a portion forming part of said walls bounding said first recess.

12. A method as claimed in claim 1, wherein said third fastening component is connected by connection means to a second flexible sheet that is different from the flexible sheet and wherein all portions of the flexible sheet and second flexible sheet are spatially offset from one another.

13. A method as claimed in claim 12, wherein said connection means enables detachment of said third fastening component from said second flexible sheet.

14. A method as claimed in claim 1, wherein any one of said fastening components is contourable to the shape of a flexible sheet to which any one of said fastening components is secured.

15. A method as claimed in claim 1, wherein a second flexible sheet that is different from the flexible sheet is secured in said second recess by engagement of said third fastening component with at least one of said first and second fastening components or the assembly thereof.

16. The method of claim 1, wherein the third said fastening component includes a side wall with a substantially flexible protrusion that flexes to allow at least one of the first and second said fastening components to be received in the second recess.

17. A method of adjustably securing a flexible sheet using at least three interfitting components; including placing a portion of said flexible sheet in a first recess provided in a first said fastening component; securing said sheet in said first recess by cooperation of a locking portion of a second said fastening component with said first recess; and securing a secured portion of an assembly comprising said first and second said fastening components and sheet to a third said fastening component by engagement of an engaging surface of the assembly with a complementary engaging surface of said third said fastening component, wherein said third said fastening component includes a second recess accommodative of a whole of said first fastening component on completion of securement, said complementary engaging surface is a surface of the second recess and said second recess is smaller than at least the secured portion of the assembly formed by said first and second said fastening components and wherein a second flexible sheet that is different and discrete from the flexible sheet is secured in said second recess by engagement of said third said fastening component with at least one of said first and second said fastening components or the assembly thereof wherein said first recess is bounded by walls which partially overhang said first recess at an open end thereof and a part of said second fastening component at least partially overlaps said overhang of said walls bounding said first recess.

18. A method of adjustably securing a flexible sheet using at least three interfitting fastening components, comprising:

placing a portion of said sheet in a first recess provided in a first said fastening component;

securing said flexible sheet in said first recess by cooperation of a locking portion of a second said fastening component with said first recess such that the flexible sheet is positioned between the first and second said fastening components; and inserting at least one of the first and second said fastening components in a second recess in a third said fastening component, the second recess being accommodative of a whole of said first said fastening component on completion of securement wherein said first recess is bounded by walls which partially overhang said first recess at an open end thereof and a part of the second said fastening component at least partially overlaps said overhang of said walls bounding said first recess.

19. The method of claim 18, wherein the part of said second said fastening component includes at least one outwardly projecting portion and the third said fastening component includes at least one wall adjacent to the at least one outwardly projecting portion of the second said fastening component and wherein the at least one outwardly projecting portion overlaps the at least one wall.

* * * * *